(12) United States Patent
Carrasco Vergara

(10) Patent No.: US 9,005,062 B2
(45) Date of Patent: Apr. 14, 2015

(54) ATTACHMENT OF AN OVOID CHAINRING

(75) Inventor: Pablo Carrasco Vergara, Ajalvir (ES)

(73) Assignee: Rotor Componentes Technologicos S.L., Madrid (ES)

( * ) Notice: Subject to any disclaimer, the term of this patent is extended or adjusted under 35 U.S.C. 154(b) by 305 days.

(21) Appl. No.: 13/811,683

(22) PCT Filed: Jul. 5, 2011

(86) PCT No.: PCT/EP2011/003325
§ 371 (c)(1),
(2), (4) Date: Jun. 24, 2013

(87) PCT Pub. No.: WO2012/010257
PCT Pub. Date: Jan. 26, 2012

(65) Prior Publication Data
US 2013/0281239 A1    Oct. 24, 2013

(30) Foreign Application Priority Data
Jul. 23, 2010  (ES) .................................. 201000953

(51) Int. Cl.
| F16H 55/30 | (2006.01) |
| F16H 55/36 | (2006.01) |
| B62M 9/08 | (2006.01) |
| B62M 9/00 | (2006.01) |

(52) U.S. Cl.
CPC ........... B62M 9/08 (2013.01); *B62M 2009/002* (2013.01)

(58) Field of Classification Search
CPC .................. F16H 2035/003; B62M 2009/002; B62M 9/08; F01L 2810/03; F02B 67/06
USPC ........................................................ 474/141
See application file for complete search history.

(56) References Cited

U.S. PATENT DOCUMENTS

| 530,058 | A | * | 11/1894 | Schaum et al. | ................ 474/112 |
| 596,289 | A | * | 12/1897 | Smith | ............................ 474/141 |
| 599,211 | A | * | 2/1898 | Williams | ...................... 474/141 |
| 702,841 | A | * | 6/1902 | Williams | ...................... 474/141 |
| 885,982 | A | * | 4/1908 | Delacroix | ...................... 474/136 |
| 2,711,221 | A | * | 6/1955 | Kopczynski | ............... 180/24.05 |

(Continued)

FOREIGN PATENT DOCUMENTS

| EP | WO2006097159 | 9/2006 |
| FR | 974415 | 2/1951 |

(Continued)

*Primary Examiner* — Henry Liu
(74) *Attorney, Agent, or Firm* — Mark Levy; Hinman, Howard & Kattell, LLP

(57) ABSTRACT

This invention is applicable to bicycle non-circular chainrings or ovoid chainrings, attachable to a drive crank arm with a spider, forming a structure with anchorage points distributed in a star like shape; the said ovoid chainring (1) having a major diameter, whose angle with the said crank arm measured in the pedaling direction defines its orientation; whereas, said ovoid chainring has a number of anchorage points to said spider which is a multiple of the number of anchorage points of the spider, constituting multiple anchorage options to this crank arm, separated in such a distance that respective orientation values differ in 3°; and for such a small variation, the proposed constructive solution is equipping the ovoid chainring with consecutive overlapped holes and respective countersinks with different depth, forming stair steps which help supporting tangential loads to the chainring.

3 Claims, 3 Drawing Sheets

(56) References Cited

U.S. PATENT DOCUMENTS

| | | | | |
|---|---|---|---|---|
| 3,190,149 | A * | 6/1965 | Gorfin | 475/167 |
| 3,259,398 | A * | 7/1966 | Hattan | 280/236 |
| 3,375,022 | A * | 3/1968 | Hattan | 280/238 |
| 4,181,034 | A * | 1/1980 | Daniel | 474/141 |
| 4,522,610 | A * | 6/1985 | Nagano | 474/141 |
| 5,692,415 | A * | 12/1997 | Lin | 74/594.6 |
| 7,749,117 | B2 * | 7/2010 | Carrasco Vergara | 474/152 |
| 2009/0280937 | A1 * | 11/2009 | Greene | 474/78 |

FOREIGN PATENT DOCUMENTS

| | | |
|---|---|---|
| FR | 2295867 | 7/1976 |
| FR | 2471906 | 6/1981 |

* cited by examiner

1

3

2

ATTACHMENT OF AN OVOID CHAINRING

This invention is applicable to bicycle non-circular chainrings, whose relative orientation or position between the major diameter of the chainring and the crank arm is a fundamental parameter in the biomechanics of pedaling that result from its usage.

PRIOR ART

On the bicycle, the cyclist applies power on two pedals. These are mounted on each crank arm, both of them being coupled through a bottom bracket spindle. One of the two crank arms incorporates one or several chainrings, which are toothed rings in order to give traction to the rear wheel, using a chain and sprocket on that wheel.

Although it is true that the majority of bicycles use round chainrings many cyclists choose to use ovoid chainrings, in order to improve pedaling performance. In this case we can talk about the orientation parameter, defined as the angle in the direction of the pedaling, between the major diameter of the chainring and the plane that contains the crank arms.

There are numerous documents and patents, some from over one hundred years ago, that talk about the convenience of using non-circular chainrings, sometimes with great differences between them, but that we can group under the "ovoid" denomination. Most of them propose specific orientations to achieve, in each case, the best possible biomechanical improvement; however, in some cases, with the objective of allowing orientation adjustments, the chainring has been given a multiple number of holes to be anchored to a crank arm using screws. In this way the user can opt for different orientations of the same chainring. This is the case of the patents, FR1090949, DE8809795 and EP1863699, the last one from the same inventor and applicant to which this document corresponds.

Upon having an ovoid chainring with different orientation options, it can be used for bicycles with different geometries or uses; however, when dealing with fine adjustments aiming to optimize the biomechanics, considering a determined chainring applied on a determined bicycle, the angular increments for the different options must be really small. And it is in respect to this point that the invention is going to focus on.

Three solutions are presented in the document EP1863699 for the anchorage of ovoid chainrings with conventional chainring screws and with different orientation options:

a) Independent holes which alternate along the perimeter at opposing end points of the diameter which defines the different orientations (solution shown in FIG. 5 of the said document). In this way, the angular increment that results between two consecutive orientation options is half the angular space that corresponds to two adjoining holes because, if we take a diameter of the circumference that places the holes, with one end point between the two adjoining holes, on the opposite side we always find a hole that defines this intermediate orientation in respect to that of the two adjoining ones. This solution is only possible when the crank arm has an odd number of anchorage points for the chainring. The case from the chainring in FIG. 5 presents orientation angular increments of 5.14°.

b) Overlapping holes, so that the angular increment that is given between two consecutive orientation options becomes the minimum possible (solution shown in FIG. 8 of that document). In that case, the resulting orientation angular increments are greater, 8° to be exact, because they have an even number of anchorage points to the crank arm.

c) Overlapping holes which alternate along the perimeter at opposing end points of the diameter which defines the different orientations, in such a way that the angular increment between two consecutive orientation options is half the angular space that corresponds to two consecutive overlapped holes (solution shown in FIG. 9 of that document). This solution, which is a combination of the two previous ones, is only possible when the crank arm has an odd number of anchorage points for the chainring. In that case, the orientation angular increment is 4°.

The experience both in competition and in the market has shown, however, that the adjustment of the orientation that entails angular increments of around 8°, makes biomechanical adjustments unviable, in spite of the convenience of these increments to adjust the chainring to the different geometries of bicycles and sporting disciplines (Cross Contry, Down Hill, BMX . . . ); and with increments of ~5°, cyclists can be found who adjust the orientation of the oval chainring to improve their biomechanics, locating on one end the purist sprinters, and on the exact opposite end the climbers, although this turns out to be too much of an increment to be valid for the majority of cyclists, since these increments correspond to very different pedaling styles.

When the holes, by overlapping them, are placed closer to each other in order to reduce the orientation increments and thus look for a better regulation of the biomechanics, the problem that we find is that these holes must be sufficiently separated so that, between them, there is enough material stretching to guarantee the tangential attachment, that is to say, that this can bear its corresponding screw so that, under load, it does not slide to the adjoining hole by breaking or deforming the material.

SUMMARY OF THE INVENTION

Recent investigations within the sporting field where the applicant company works have been able to prove how a fine adjustment capability of orientation significantly aids the proper use of the ovoid chainring for the great majority of cyclists. Thus, a value of around 3° would be optimal, given that ±6° can cover the needs of most extreme cyclists, an intermediate value covers the most common pedaling styles.

But, depending on the standard of the crank arm that is attached to the ovoid chainring, the said value will not always be attainable and, in this case, the best solution will be an angle which is the closest possible to that value.

Logically, in the case of crank arms with an even number of anchorage points, values that double those for crank arms with an odd number will have to be enough, being the first option always at a disadvantage with respect to biomechanical adjustment.

It also affects when establishing the lowest possible angular increment between overlapped holes, the diameter that the crank arm's anchorage points to the chainring adopt, given that at a higher value, the lower will be the angle formed in respect to the center of two consecutive holes, separated by the same distance.

In this sense, a constructive solution is proposed that allows equipping the ovoid chainring with consecutive overlapped holes that are closer to each other, to allow for an angular value closer to the optimum. For this, we will take advantage of the countersinks which are placed in order to support the heads of the bolts and corresponding nuts which constitute the means of standard anchorage of the chainrings to their crank arm. The solution consists of a staired construction for the overlapped countersinks given that, in this way, the tangential attaching capability is maintained (when facing a load on the chainring) in spite of having reduced the stretch between consecutive holes. These countersinks will have stepping depth which will decrease for each adjoining hole following the pedaling direction.

SHORT DESCRIPTION OF THE FIGURES

FIG. 1 shows a specific ovoid chainring for standard crank arm spider with 4 anchorage points. This chainring has three options to regulate the orientation. The three holes that correspond to each anchorage point are overlapped in corresponding groups.

FIG. 2 shows a detailed perspective view of the aforementioned chainring, where one can appreciate the staired construction of the countersinks, bordering the anchorage holes.

FIG. 3 shows an ovoid chainring which is specific for standard crank arm spiders with 5 anchorage points. This chainring has 4 options to regulate the orientation. The holes that correspond to each anchorage point alternate along opposed side of the perimeter (at opposing end points of corresponding diameters) and overlap in groups of two.

DETAILED DESCRIPTION OF EMBODIMENTS OF THE INVENTION

A bicycle ovoid chainring is proposed which can be attached to a standard bicycle crank arm. This crank arm has a fixed spider on its end that corresponds to the bottom bracket spindle. This spider forms a structure with holes or anchorage points distributed star like with the objective to hold one or several bicycle's chainrings.

This ovoid chainring has holes that form the anchorage points to the spider through standard bolts and nuts, but having available so many holes that are a multiple number of their respective anchorage points of this spider. This multiplicity will allow several assembly options of the chainring in the spider, and therefore in the crank arm, and each one with a different orientation.

In this sense, it is always sought that the resulting orientations keep close values between themselves, around a preferable central value, and that the angular increment upon choosing the closest alternative orientations is as close as possible to 3°.

To do this, the chainring holes that correspond to the same hole in the spider will be placed grouped and overlapped. The distance from each hole to the adjoining one will be the minimum possible to guarantee the integrity of the chainring and, for this, an angle gap between adjoining holes of 6° is proposed combined with the staired countersinks (3 and 6) that border each hole (2 and 5 respectively), with incremental depth step of around 0.4 mm.

Figure 3:
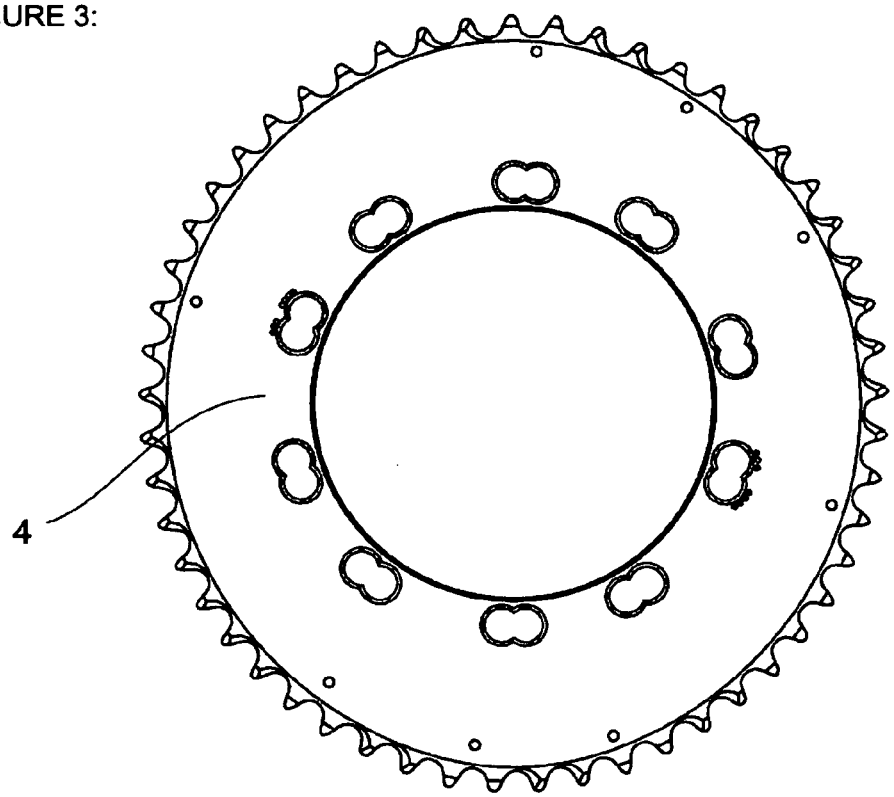
Figure 4:
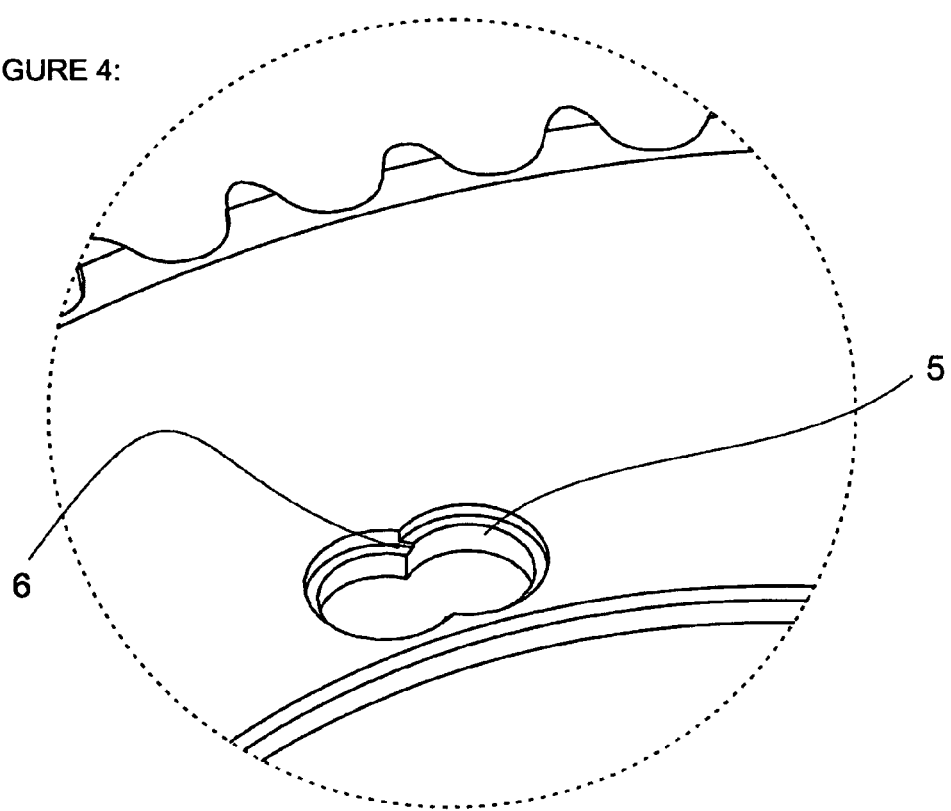
FIG. 4 shows a detailed perspective view of the aforementioned chainring, where one can appreciate the staired countersinks bordering the anchorage holes.

In the case of a crank arm with spider with an odd number of anchorage points, the chainring (4) will have two groups of overlapping holes that correspond to each anchorage point on the spider crank. In fact, in the case of the chainring of FIG. 3, four possible orientations are obtained, where the holes overlap in groups of two, because in this way the piece is less weakened. In the case of the chainring in FIG. 3 and FIG. 4, the separation between overlapped holes (5) corresponds to 6°. These groups will be 177° perimetrally opposed, in such a way that the orientation of the chainring can vary every 3°, which was the objective.

Figure 1:
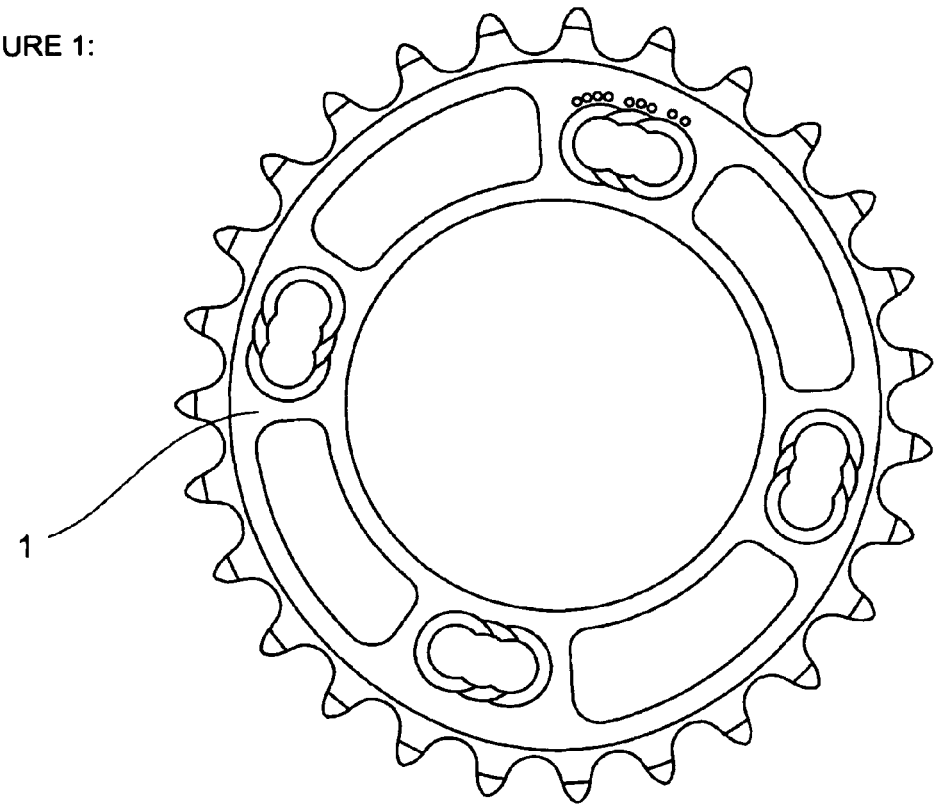
Figure 2:
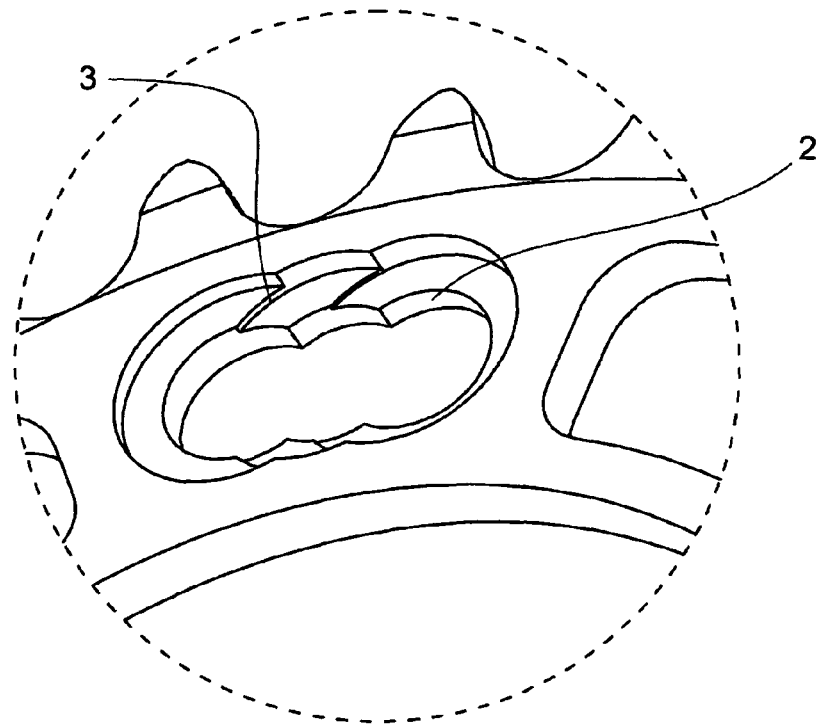

And for chainrings (1) meant for crank spiders with an even number of anchorage points, we propose 3 possible orientations and, therefore, overlapping the holes (2) in groups of three. In the case of the chainring of FIG. 1 and FIG. 2, the separation between overlapped holes corresponds to 6°. For this we have reached a compromise solution that, not being fine enough to reach the biomechanical optimal, guarantees the structural integrity of the chainring.

Figure 5:
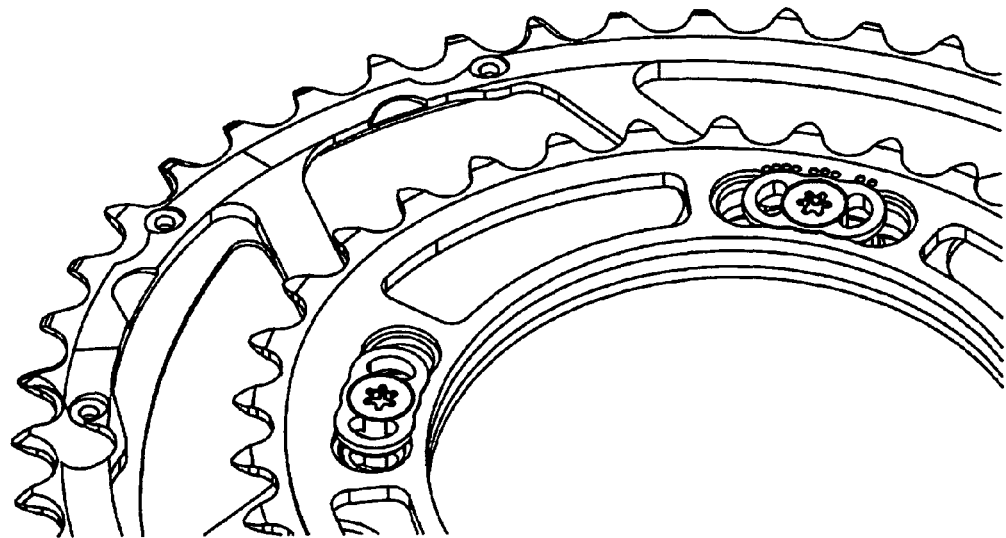
FIG. 5 shows ovoid chainrings with overlapped, adjoining holes that, as an anchorage system use clamps.
Figure 6:
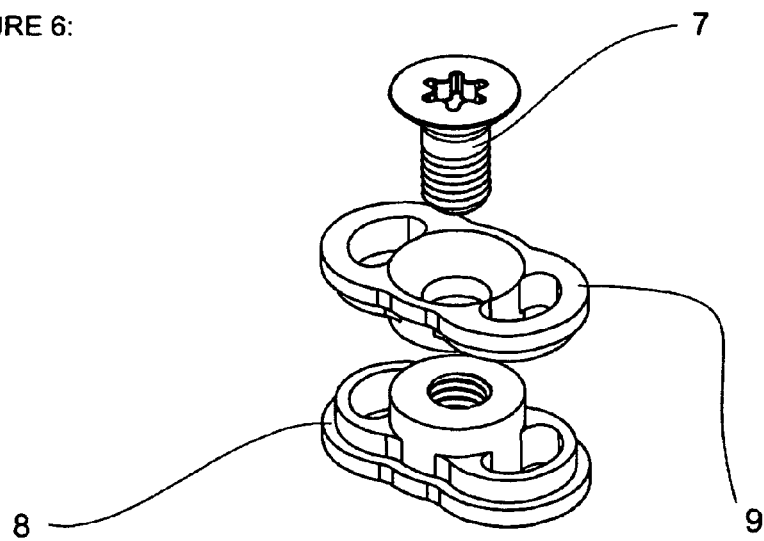
FIG. 6 shows a blown-up view of the clamp, the anchorage system for the set of chainrings shown in the previous figure.

At the same time, there are other possibilities if other conventional anchorage systems are used, substituting the standard group of bolts and nuts on the bicycles; then chainrings for crank arms with an even number of anchorage points and with orientation options with more closed angular increments could be built, that reach values of around 3°. This is, for example, the case of the chainrings in FIG. 6, where the chainrings are held between screwed (7) clamps (8 and 9) in FIG. 5 that, upon reinforcing the fixing, the lateral attachment is strengthened, thus allowing a reduced distance between adjoining holes.

The invention claimed is:

1. An ovoid bicycle chainring for attaching to a crank arm comprising a spider and anchorage points distributed in a star-like shape, said chainring comprising:
   a major diameter, whose angle with said crank arm measured in the pedaling direction defines its orientation;
   a plurality of anchorage points to said crank arm spider, which is a multiple of the number of anchorage points of the spider, different anchorage points of said chainring comprising adjoined and overlapped holes corresponding to the same anchorage point on the spider, each of said holes having a countersink; and
   wherein, the depth of each overlapped adjoining hole countersink decreases in the direction of pedaling, forming stair steps.

2. The ovoid bicycle chainring according to claim 1, wherein said overlapped adjoining holes of said chainring is separated 6° from one another in their positioning perimeter.

3. The ovoid bicycle chainring, according claim 1, wherein said spider has an odd number of chainring anchorage points, the different anchorage points corresponding to a same anchorage point on said spider, and holes placed at alternate end points of separated diameters with the same angular increment form two groups of adjoining overlapped holes disposed perimetrally opposed in the chainring.

* * * * *